(12) United States Patent
Thompson et al.

(10) Patent No.: US 7,678,219 B2
(45) Date of Patent: Mar. 16, 2010

(54) METHOD FOR MAKING SEGMENTED COMPOSITE PANEL WITH FALSE JOINTS

(75) Inventors: Robbie Thompson, Bauxite, AR (US);
Steven Veazey, Sheridan, AR (US);
Charles Edwards, Alexander, AR (US);
Russell Atchley, Sheridan, AR (US)

(73) Assignee: Centria, Moon Township, PA (US)

( * ) Notice: Subject to any disclaimer, the term of this patent is extended or adjusted under 35 U.S.C. 154(b) by 868 days.

(21) Appl. No.: 11/500,128

(22) Filed: Aug. 7, 2006

(65) Prior Publication Data

US 2008/0029209 A1 Feb. 7, 2008

(51) Int. Cl.
*B32B 38/04* (2006.01)
*E04B 2/42* (2006.01)
*B29C 65/56* (2006.01)
*B31F 1/00* (2006.01)

(52) U.S. Cl. .................. 156/199; 156/71; 156/196; 156/250; 156/252; 156/256; 156/258; 52/415; 52/416; 52/418; 52/422; 52/314; 52/404.4; 52/555

(58) Field of Classification Search ............ 156/71, 156/196, 199, 250, 252, 256, 258; 52/236.7, 52/236.9, 309.9, 309.11, 314, 404.4, 415, 52/416, 418, 422, 555, 579, 588.1
See application file for complete search history.

(56) References Cited

U.S. PATENT DOCUMENTS

| | | | | |
|---|---|---|---|---|
| 4,037,377 A | * | 7/1977 | Howell et al. | 52/309.9 |
| 4,413,457 A | * | 11/1983 | Lahm et al. | 52/314 |
| 4,608,795 A | | 9/1986 | Neuschaeffer et al. | |
| 6,253,511 B1 | | 7/2001 | Boyer | |
| 6,627,128 B1 | | 9/2003 | Boyer | |
| 6,968,659 B2 | | 11/2005 | Boyer | |
| 7,007,433 B2 | | 3/2006 | Boyer | |
| 2001/0009085 A1 | * | 7/2001 | Boyer | 52/236.9 |

* cited by examiner

*Primary Examiner*—Mark A Osele
*Assistant Examiner*—Christopher C Caillouet
(74) *Attorney, Agent, or Firm*—The Webb Law Firm

(57) ABSTRACT

A method of forming a building panel is provided, with the building panel including facer and liner sheets surrounding a foam core. The method includes the steps of pre-notching the facer sheet at each false joint, roll forming the side joints of the facer sheet, bending the facer sheet, via a press operation, at the pre-notched area to form the false joint, such that the facer sheet is a continuous sheet across the false joint, and bonding the facer sheet having the false joint and the liner sheet to the foam core to form the building panel.

15 Claims, 8 Drawing Sheets

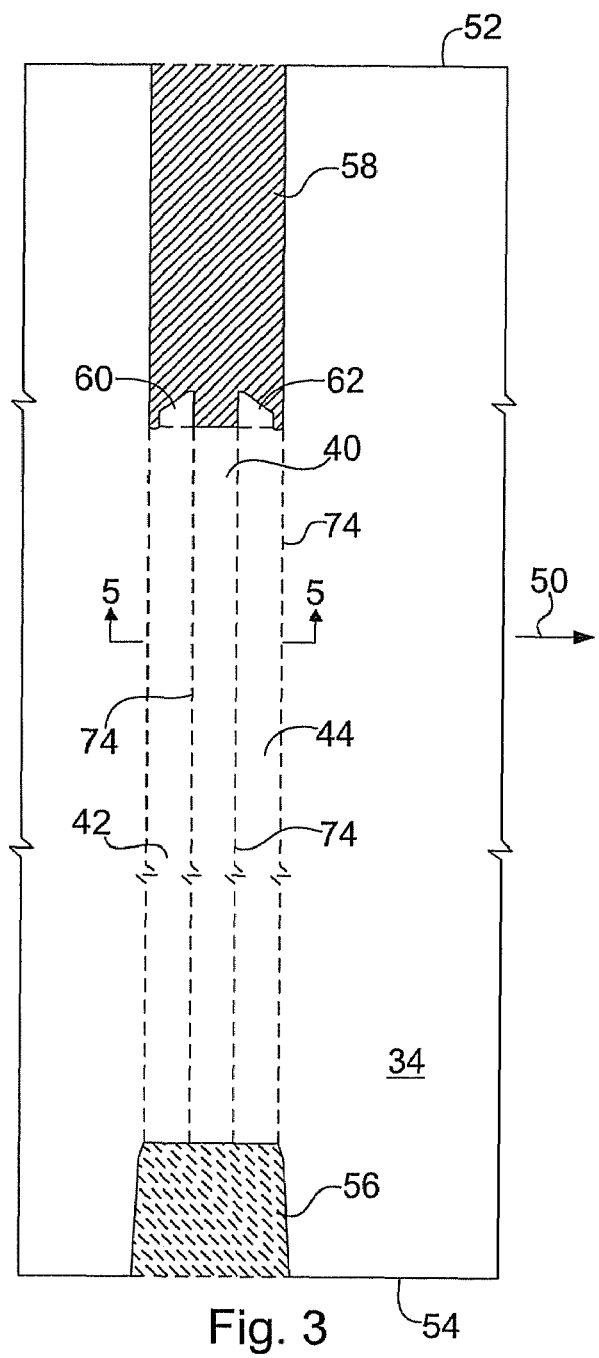
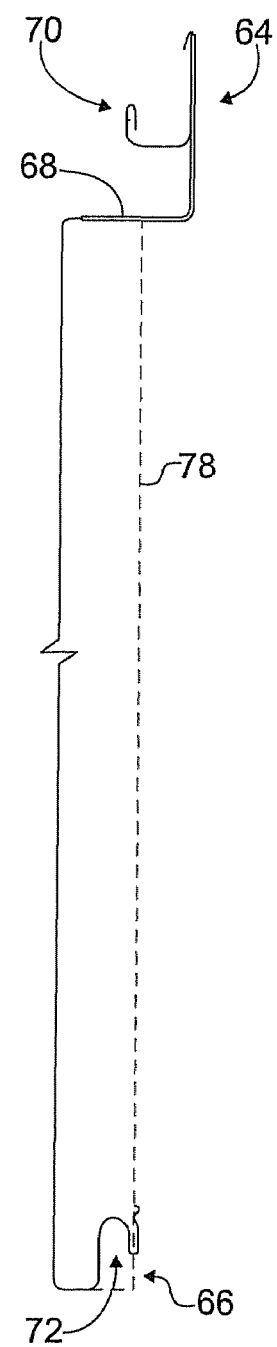
Fig. 3
Fig. 4

METHOD FOR MAKING SEGMENTED COMPOSITE PANEL WITH FALSE JOINTS

FIELD OF THE INVENTION

The present invention is directed toward composite architectural panels and, more particularly, towards composite architectural panels with false joints and methods of making the same.

BACKGROUND OF THE INVENTION

Composite architectural wall panels have typically been manufactured in multi-step processes which often involve both sheet manufacturers and panel fabricators. Initially, a composite sheet is manufactured by laminating metal skins to a plastic or foam core. An example of such a composite sheet is the "ALUCOBOND" material produced by Alusuisse Group, Ltd., Zurich, Switzerland. Then, the sheets are typically shipped to a fabricator where they are cut to size and routed so as to return the edges around the perimeter. Extrusions are typically fabricated and applied to the panel perimeter to create panel joinery. Also, stiffeners are typically applied in the field to the major flattened portion of the panel to reduce bowing of the panel under a load. All of the above tends to represent a rather cumbersome and costly process.

Insulated composite architectural wall panels are typically manufactured on a continuous manufacturing line with a continuous metal liner. A series of separate metal facer elements are placed in a foam line and the panels are formed by bonding the facer sheets and the metal liner to a core material (e.g., foam). The panels are cut or separated at the ends of the facer sheets. The standard finished panel product has a single liner element and a single facer element (the liner and facer elements, or sheets, are typically referred to in the industry as "metal skins"). When needed, a series of facer sheets are combined over one liner sheet to make a larger and longer panel. The intermediate joints become false joints, as shown in FIG. 1. The separate facer elements are joined within a panel at the false joints, which give a larger panel the appearance of separate smaller panels.

In the erection phase, the panels are typically attached to a steel frame. The insulation costs of the panels is a function of their size in length and width. When short panels are required, the per unit installation costs of the panels is quite high. To mitigate this high cost, panels having false joints as described above have been used which include several facer element segments over one liner element in the completed panel to give the appearance of shorter panels. The several facer element segments were connected together to form the false joints, which gives the panel the appearance of several shorter panels. FIG. 1 is a partial cross-sectional view of such a prior art panel, shown generally at 10, at the false joint 12.

As shown in FIG. 1, the panel 10 includes a continuous liner element 14 and separate facer elements 16 and 18 bonded to an insulating structural core 20. The separate facer elements 16 and 18 are bent inward at the false joint 12 and coupled together by a false joint receiver clip 22. A false joint gasket 24 is connected to the receiver clip 22 to provide the appearance of a panel joint at the false joint 12. As shown in FIG. 1, a sealant 26 may be provided on inside surfaces of the facer elements 16 and 18 at the false joint 12 at the connection with the receiver clip 22.

Forming larger panels having the separate facer elements forming the false joints became quite cumbersome and costly in the plant. Quality issues also arose due to panel length variations and the use of separate facer elements to form the false joints. The successfully completed units did, however, illustrate that there are advantages in field labor savings to be realized in using larger panels having false joints.

The present invention is directed toward overcoming one or more of the above-identified problems.

SUMMARY OF THE INVENTION

The present invention simplifies the formation of false joints in larger composite architectural panels using a continuous facer element along with a continuous liner element bonded to a core material. The false joints can be formed at any position along the length of the panel, and allows various aesthetic designs to be achieved through strategic attachment of the panels to the building frame. One such design that can be achieved is a masonry brick design where the false joints are placed such that the panels have a staggered appearance. Also by staggering the panels a running bond appearance is achieved. The panels may be flat or have a textured surface, and by embossing or chamfering the flat area of the panel, a stone effect can be achieved. Also, this process allows a greater number of false joints and a shorter length of facer sheet between the false joints as compared to the prior art of individual facer sheets between the false joints.

In one form of the invention, a method of forming a building panel is provided, with the building panel including facer and liner sheets surrounding a core material. The method includes the steps of pre-notching the facer sheet at each false joint, roll forming the side joints of the facer sheet, bending the facer sheet, via a press operation, at the pre-notched areas to form the false joints, such that the facer sheet is a continuous sheet across the false joints, and bonding the facer sheet having the false joints and the liner sheet to the core material to form the building panel.

The facer sheet is also pre-notched at each real joint, and the building panels are cut to length at each real joint. The core material is typically an insulating material such as foam, however, other core materials are also contemplated.

In one form, a rubber gasket is placed into the false joint, and is adhered to the facer sheet at the false joint by an adhesive. The rubber gasket provides the appearance of a real joint at the false joint which, in turn, provides the appearance of smaller panels. Of course, the false joint may simply be left as is without attaching the rubber gasket.

The false joint includes a depression formed in the facer sheet, with the depression including a base surface extending into the foam core and opposing side surfaces connecting the base surface to the exterior face of the facer sheet. Tabs are provided, one each on the opposing side surfaces, at the pre-notched area, and the tabs are folded under one of the side joints of the facer sheet in the formation of the false joint. In one form, the one side joint of the facer sheet includes a sloped shelf, wherein the tabs are folded under the sloped shelf in the formation of the false joint.

A further method of forming a building panel is provided, the building panel including facer and liner sheets surrounding a core material. The method generally includes the steps of pre-notching the facer sheet, which is provided in the form of a coil of sheet material having a length and opposed ends defining a width, at the opposed ends at each false joint along the length of the facer sheet. The facer sheet is also pre-notched at the opposed ends at each real joint along the length of the facer sheet. The opposed ends of the facer sheet are roll formed to form side joints, and the facer sheet is bent across its width, via a press operation, at the pre-notched areas to form the false joints, such that the facer sheet is a continuous sheet across the false joints. The facer sheet is cut at each real joint to form a plurality of facer sheets, and the plurality of facer sheets having the false joints and the liner sheet are bonded to the core material. The core material and liner sheet are then cut at each real joint of the facer sheets to form separate building panels.

A building panel is also provided in accordance with the present invention including a facer sheet having opposed side joints defining a width, a liner sheet, a core material bonded between the facer and liner sheets, and at least one false joint formed in the facer sheet extending between the side joints, such that the facer sheet is a continuous sheet across the at least one false joint. The false joint includes a base surface extending into the foam core, opposing side surfaces connecting the base surface to the facer sheet, and a tab formed one each on the opposing side surfaces at one of the side joints, with the tabs folded under the one side joint in the formation of the false joints.

The false joint is generally U-shaped in cross-section, and a joint closure is provided on the one side joint at the false joints.

It is an object of the present invention to reduce manufacturing and/or installation costs associated with composite panels having false joints.

It is a further object of the present invention to provide a composite panel having false joints with improved thermal efficiency.

It is yet a further object of the present invention to provide a composite panel having false joints with a continuous facer element across the false joints.

It is still a further object of the present invention to increase the strength of composite panels having false joints.

Other objects, aspects and advantages of the present invention can be obtained from a study of the specification, the drawings, and the appended claims.

BRIEF DESCRIPTION OF THE DRAWINGS

FIG. 3 is a top view of a facer sheet being rolled off of a coil in the manufacture of a composite building panel in accordance with the present invention;

FIG. 4 is a side view of the facer sheet of FIG. 3 after roll forming of the side joints;

DETAILED DESCRIPTION OF THE INVENTION

Figure 1:
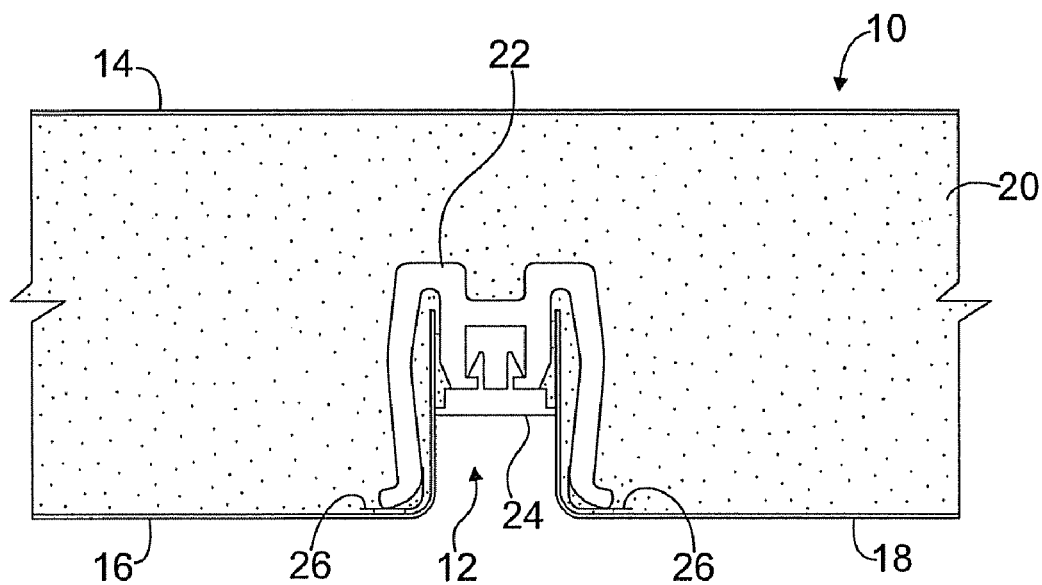
FIG. 1 is a partial cross-sectional view of a prior art composite panel.
Figure 2:
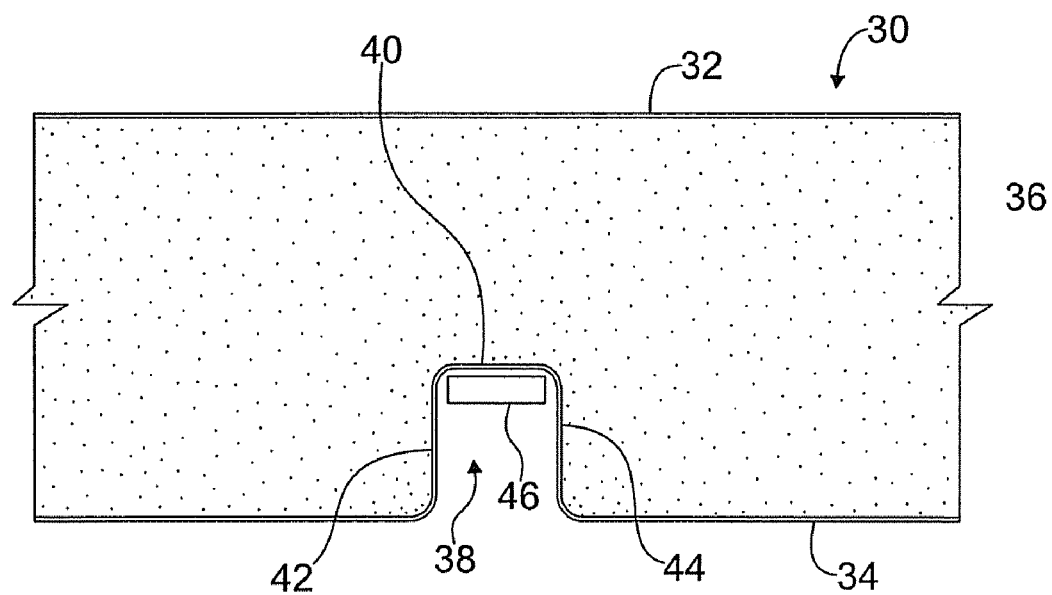
FIG. 2 is a partial cross-sectional view of a composite building panel in accordance with the present invention.

FIG. 2 illustrates a partial cross-sectional view of a composite building panel, shown generally at 30, manufactured in accordance with the present invention, at one of its false joints. The building panel 30 includes a liner element 32, a facer element 34, and a core material 36 bonded to the liner 32 and facer 34 elements and filling the interior space of the building panel 30. The liner 32 and facer 34 elements may also be referred to herein as sheets. Typically, the core material 36 is an insulating, structural foam core made from a foam or polymer (e.g., polyurethane). However, other core materials may be used without departing from the spirit and scope of the present invention.

As shown in FIG. 2, the building panel 30 includes a false joint 38 formed therein at predefined positions along the length of the facer element 34. Typically, the liner element 32 defines the interior surface of the building panel 30, while the facer element 34 is the exterior surface of the building panel 30 which is viewable.

The false joint 38 is formed a press operation and includes a base surface 40 which extends into the core material 36 and is generally parallel to the facer element 34. The false joint 38 further includes opposing side surfaces 42 and 44 connecting the base surface 40 to the facer sheet 34, with the opposing side surfaces 42 and 44 generally perpendicular to the base surface 40 and facer element 34. In this form, the false joint 38 generally has a U-shaped cross-section (see FIG. 5). While the false joint 38 is described herein as having a U-shaped cross-section, the false joint 38 may have other shapes, such as a V-shaped cross-section, etc., depending upon a desired application and appearance.

A gasket 46 is provided in the false joint 38 and is attached to the base surface 40 by means of an adhesive (not shown) or other conventional means. In a preferred form, the gasket 46 is a rubber gasket, but may be made of other materials without departing from the spirit and scope of the present invention. The gasket 46 provides the false joint 38 with the appearance of a real joint between adjacent panels, thus allowing a larger panel to be manufactured which has the appearance of several shorter panels. This helps to reduce installation costs when the appearance of shorter panels is desired.

The liner 32 and facer 34 sheets are typically provided in coil form, and are rolled off of the coils to form the building panels. FIG. 3 illustrates the facer sheet 34 being rolled off of such a coil in the direction of arrow 50. The facer sheet 34 includes a length defined by the rolled coil, and a width defined by opposed ends 52 and 54. In forming the building panels, the facer sheet 34 is pre-notched at the opposed ends 52, 54 along its length at each of the false joints 38. As shown in FIG. 3, the end 54 includes a pre-notch 56 having a generally rectilinear shape, while the end 52 includes a pre-notch 58 also generally rectilinear in shape. The pre-notched areas 56 and 58 are sized to accommodate the base 40 and opposing side surfaces 42 and 44, which will be bent via a press operation to form the false joint 38.

The pre-notched area 58 includes tabs 60 and 62 which extend from the ends of the opposed side surfaces 42 and 44, respectively. These tabs 60 and 62 will be folded under a side joint formed at the end 52 in the formation of the false joint 38, as will be described hereafter.

The facer sheet 34 is also pre-notched along its length at each real joint, which defines an end of a building panel. Thus, each building panel may have any number of false joints formed in it between each of the real joints. The number of false joints will depend on the desired appearance of the building panel.

After the facer sheet 34 is pre-notched at each of the false and real joints, the side joints of the facer sheet 34 are roll formed at its opposed end 52 and 54, as is known in the relevant art. FIG. 4 illustrates a side view of the facer sheet 34 after roll forming the side joints 64 and 66. The side joint 64 and 66 are formed such that the side joint 66 of one building panel will engage the side joint 64 of an adjacent building panel. In one form, the side joint 64 is formed such that it includes a sloped shelf 68 and an edge-hook connection 70. The sloped shelf 68 is designed such that water will run off of the building panel instead of connecting thereon, and may include apertures formed therein for drainage purposes. The edge-hook connection 70 is designed such that it engages a corresponding female receptacle 72 formed in side joint 66 of an adjacent building panel.

Figure 5:
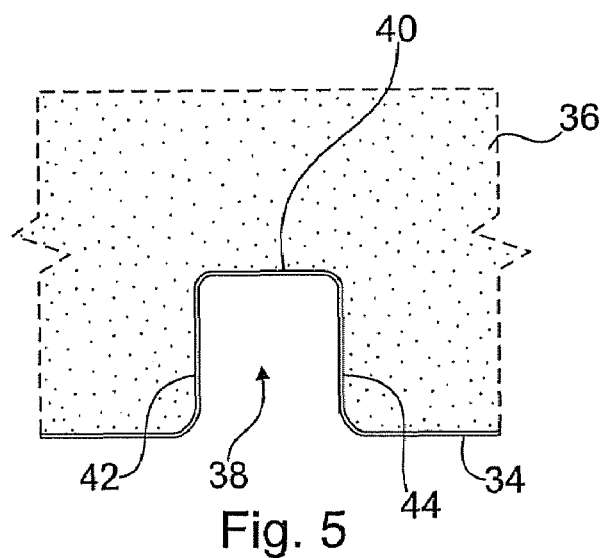
FIG. 5 is a cross-sectional view taken along line 5-5 in FIG. 3 after formation of the false joint.

After the side joints 64 and 66 are roll formed, the false joints are formed across the facer sheet 34 via a press operation. As shown in FIG. 3, the false joints are formed by bending the facer sheet 34 between the pre-notched areas along the bend lines 74. After bending, the false-joint 38 is typically U-shaped, as shown in FIG. 5, and includes the base surface 40 extending into the core material 36 and the opposing side surfaces 42 and 44.

Figure 6:
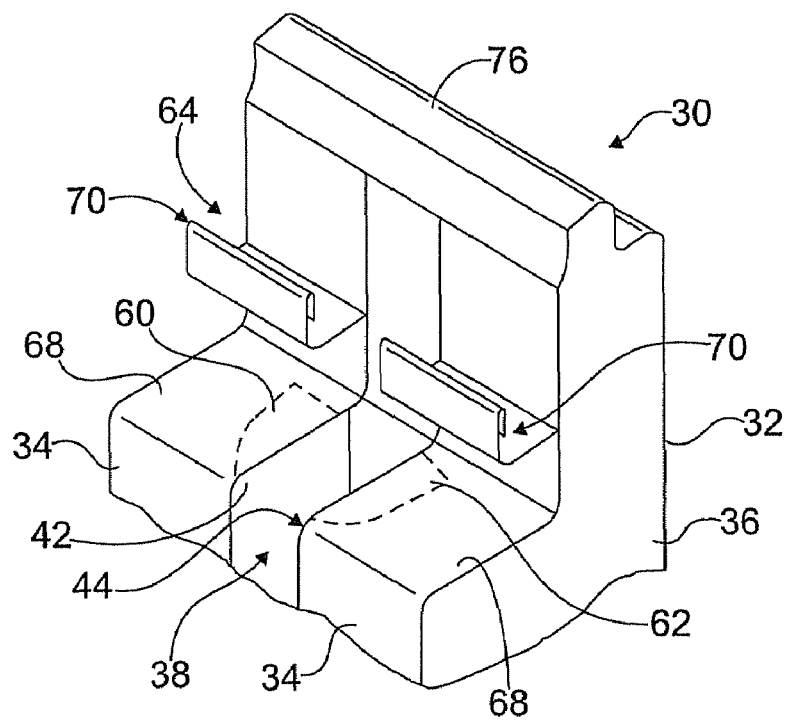
FIG. 6 is a perspective view of a composite building panel at the false joint in accordance with the present invention.

As shown more clearly in FIG. 6, when the false joint 38 is press formed, the tabs 60 and 62 are folded under the side joint 64. More specifically, the tabs 60 and 62 are folded under the sloped shelf 68 of the side joint 64. This helps to provide structural rigidity to the false joint 38.

The facer element 34 is then cut to length at each of the pre-established real end joints to form a plurality of facer sheets. Each of the facer sheet panels is then placed onto a foam line, and the panels are foamed by bonding the facer sheets and the liner sheet 32 to a core material 36. After such bonding, the finished building panels are cut to length at the pre-established real end joints to form separate building panels. Since the facer element 34 has already been cut, this cutting typically involves only cutting through the core material 36 and the liner element 32.

While the facer sheets have been described as being precut to a panel length before foaming, the facer sheet 34 may be maintained as one continuous sheet and cut to the various panel sizes after foaming.

A gasket 46 is placed in the false joint 38 and adhered to the base surface 40 by means of an adhesive (not shown). The gasket 46 provides the appearance of a real joint at each false joint 38. Since pre-notching the facer sheet 34 will result in discontinuities at the side joint 64, a joint closure element 76 (see FIG. 6) is provided at the side joint 64 of the finished panels at each false joint to close the false joint at the side joint 64.

The depth of the false joint 38 is generally dictated by the thickness of the panel. As shown in FIG. 4, the false joint 38 has a depth corresponding to the dotted line 78. This depth is generally limited by the thickness of the facer sheet 34 at its end joint 66. For example, for a panel having a 2-inch thickness, the maximum thickness of the false joint will typically be approximately ¾-inch. However, other depth dimensions of the false joints are contemplated without departing from the spirit and scope of the present invention.

FIG. 7-10 illustrate forming a building panel 30' having a greater thickness than that described with respect to FIG. 2-6, with like elements of FIGS. 2-6 indicated with the same reference number and those elements requiring modification indicated with a prime (').

Figure 7:
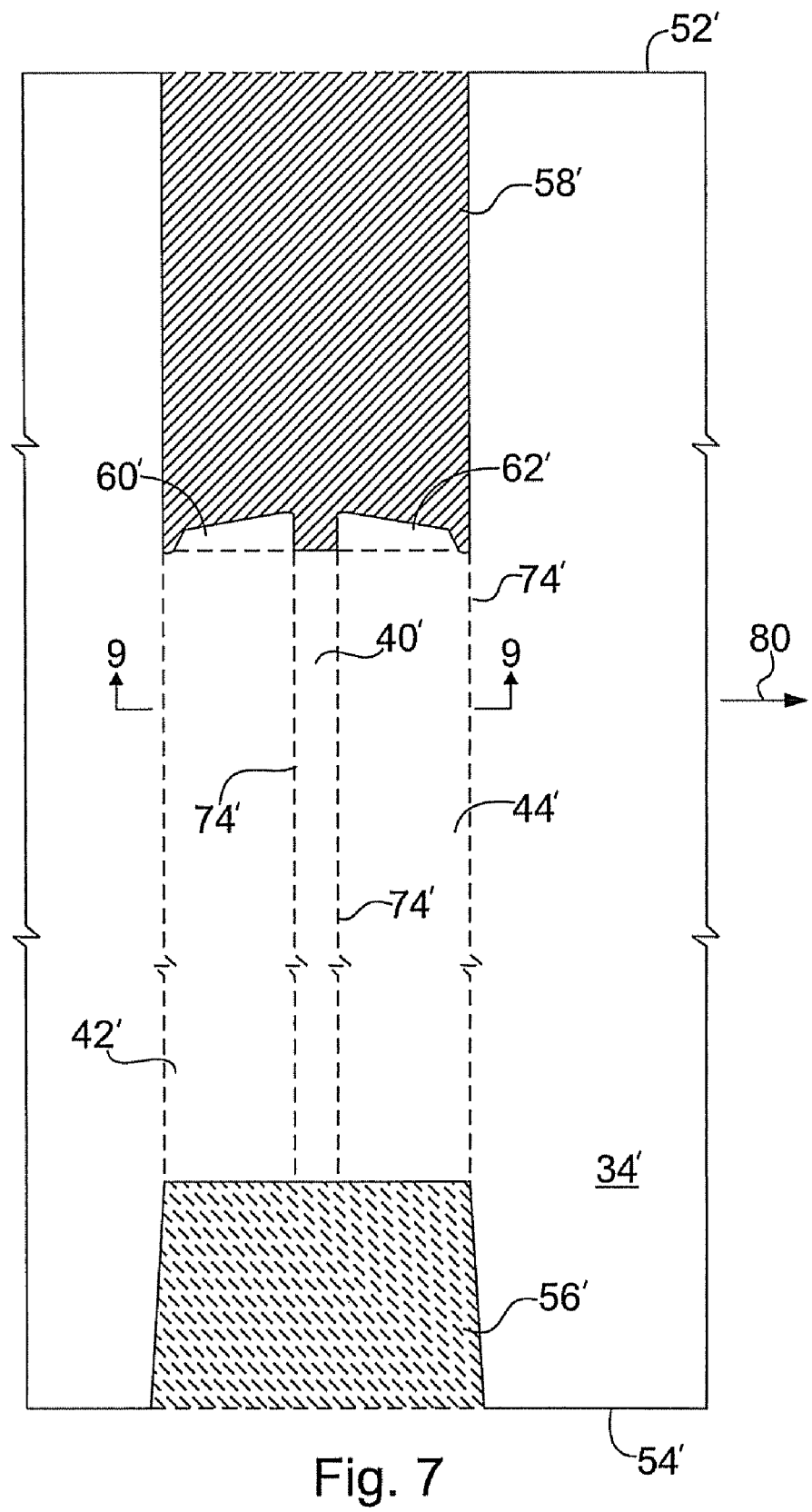
FIG. 7 is a top view of a facer sheet being rolled off of a coil in the manufacture of an alternate composite building panel in accordance with the present invention.

FIG. 7 illustrates the facer sheet 34' coming off a coil in the direction of arrow 80 in the formation of a building panel having a greater thickness. The facer sheet 34' includes a length defined by the rolled coil, and a width defined by opposed ends 52' and 54'. In forming the building panels, the facer sheet 34' is pre-notched at the opposed ends 52', 54' along its length at each of the false joints 38'. As shown in FIG. 7, the end 54' includes a pre-notch 56' having a generally rectilinear shape, while the end 52' includes a pre-notch 58' also generally rectilinear in shape. The pre-notched areas 56' and 58' are sized to accommodate the base 40' and opposing side surfaces 42' and 44', which will be bent via a press operation to form the false joint 38'. As shown in FIG. 7, the pre-notched areas 56', 58' of the false joints are thicker to accommodate the greater depth of the false joint 38'.

Figure 10:
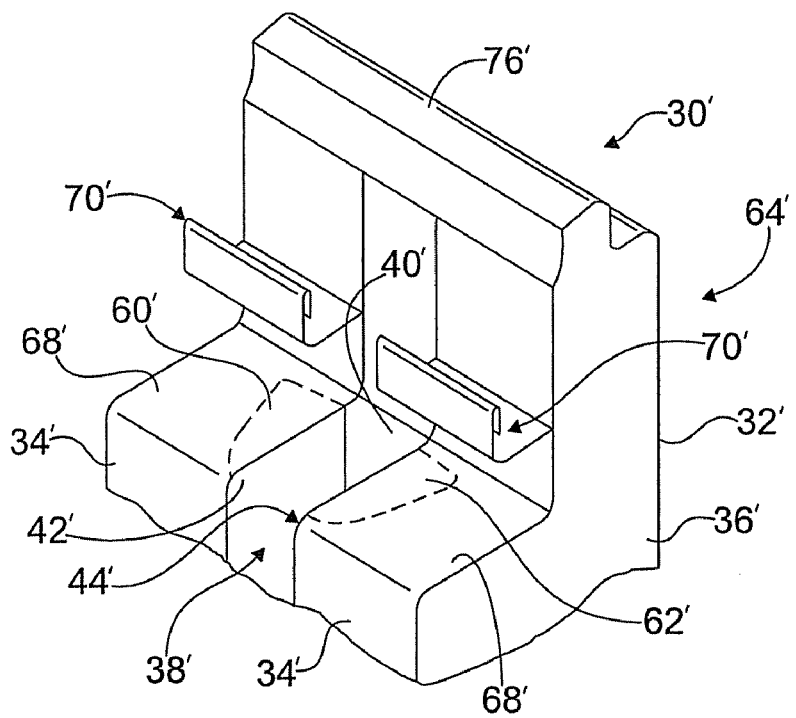
FIG. 10 is a perspective view of the alternate composite building panel at the false joint in accordance with the present invention.

The pre-notched area 58' includes tabs 60' and 62' which extend from the ends of the opposed side surfaces 42' and 44', respectively. These tabs 60' and 62' are folded under a side joint formed at the end 52' in the formation of the false joint 38'. More specifically, as shown in FIG. 10, the tabs 60' and 62' are folded under the sloped shelf 68' formed at side joint 64'.

The facer sheet 34' is also pre-notched along its length at each real joint, which defines an end of a building panel. Thus, each building panel may have any number of false joints formed in it between each of the real joints. The number of false joints will depend on the desired appearance of the building panel. In forming the false and real joints, one set of hydraulic presses and dies may be utilized, or two sets of hydraulic presses and dies may be implemented, with one set notching the false joints and the other set notching the real joints.

Figure 8:
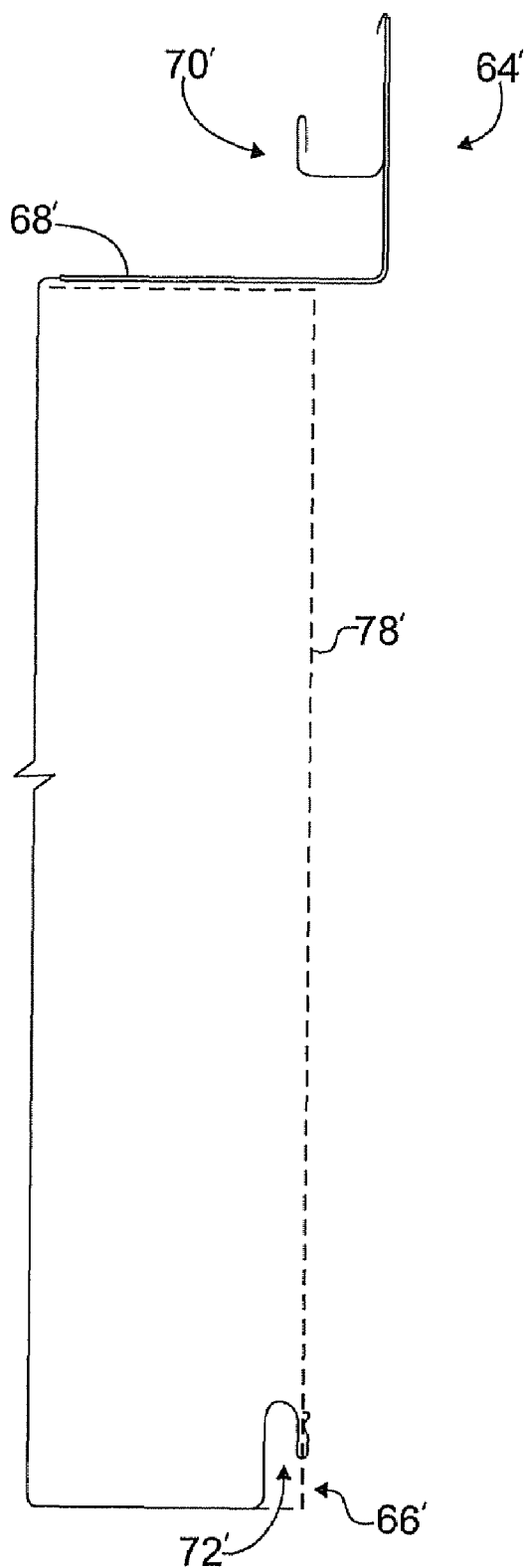
FIG. 8 is a side view of the facer sheet of FIG. 7 after roll forming the side joints.

After the facer sheet 34' is pre-notched at each of the false and real joints, the side joints of the facer sheet 34' are roll formed at its opposed end 52' and 54', as is known in the relevant art. FIG. 8 illustrates a side view of the facer sheet 34' after roll forming the side joints 64' and 66'. The side joints 64' and 66' are formed such that the side joint 66' of one building panel will engage the side joint 64' of an adjacent building panel. As previously described, the side joint 64' is formed such that it includes a sloped shelf 68' for water run off and an edge-hook connection 70' designed such that it engages a corresponding female receptacle 72' formed in side joint 66' of an adjacent building panel.

Figure 9:
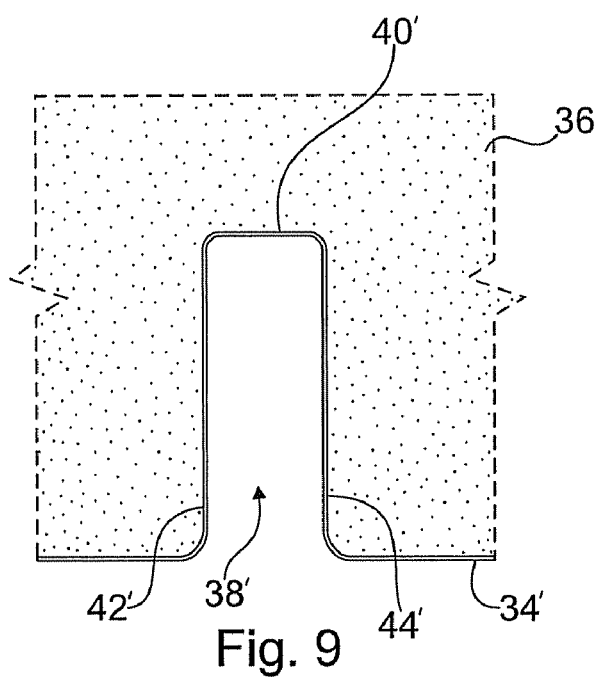
FIG. 9 is a cross-sectional view taken along line 9-9 in FIG. 7 after formation of the false joint.

After the side joints 64' and 66' are roll formed, the false joints are formed across the facer sheet 34' via a press operation. As shown in FIG. 7, the false joints are formed by bending the facer sheet 34' between the pre-notched areas along bend lines 74'. After bending, the false-joint 38' is typically U-shaped, as shown in FIG. 9, and includes the base surface 40' extending into the core material 36 and the opposing side surfaces 42' and 44'.

As shown more clearly in FIG. 10, when the false joint 38' is press formed, the tabs 60' and 62' are folded under the side joint 64'. More specifically, the tabs 60' and 62' are folded under the sloped shelf 68' of the side joint 64'. This helps to provide structural rigidity to the false joint 38'.

As previously described, the facer element 34' is then cut to length at each of the pre-established real end joints to form a plurality of facer sheets. Each of the facer sheet panels is then placed onto a foam line, and the panels are foamed by bonding the facer sheets and the liner sheet 32 to a core material 36. After such bonding, the finished building panels are cut to length at the pre-established real end joints to form separate building panels. Since the facer element 34' has already been cut, this cutting typically involves only cutting through the core material 36 and the liner element 32.

As previously noted, while the facer sheets have been described as being precut to a panel length before foaming, the facer sheet may be maintained as one continuous sheet and cut to the various panel sizes after foaming.

A gasket 46 is placed in the false joint 38' and adhered to the base surface 40' by means of an adhesive (not shown). The gasket 46 provides the appearance of a real joint at each false joint. Since pre-notching the facer sheet 34' will result in discontinuities at the side joint 64', a joint closure element 76 (see FIG. 10) is provided at the side joint 64' of the finished panels at each false joint to close the false joint at the side joint 64'.

As previously noted, the depth of the false joint 38' is generally dictated by the thickness of the panel. As shown in FIG. 8, the false joint 38' has a depth corresponding to the dotted line 78'. This depth is generally limited by the thickness of the facer sheet 34' at its end joint 66'. For example, the facer sheet 34' is designed for a panel having a 3-inch thickness. For a 3-inch thick panel, the false joint 38' will typically have a depth of 1¾ inches. However, the present invention contemplates other false joint depths.

Figure 11:
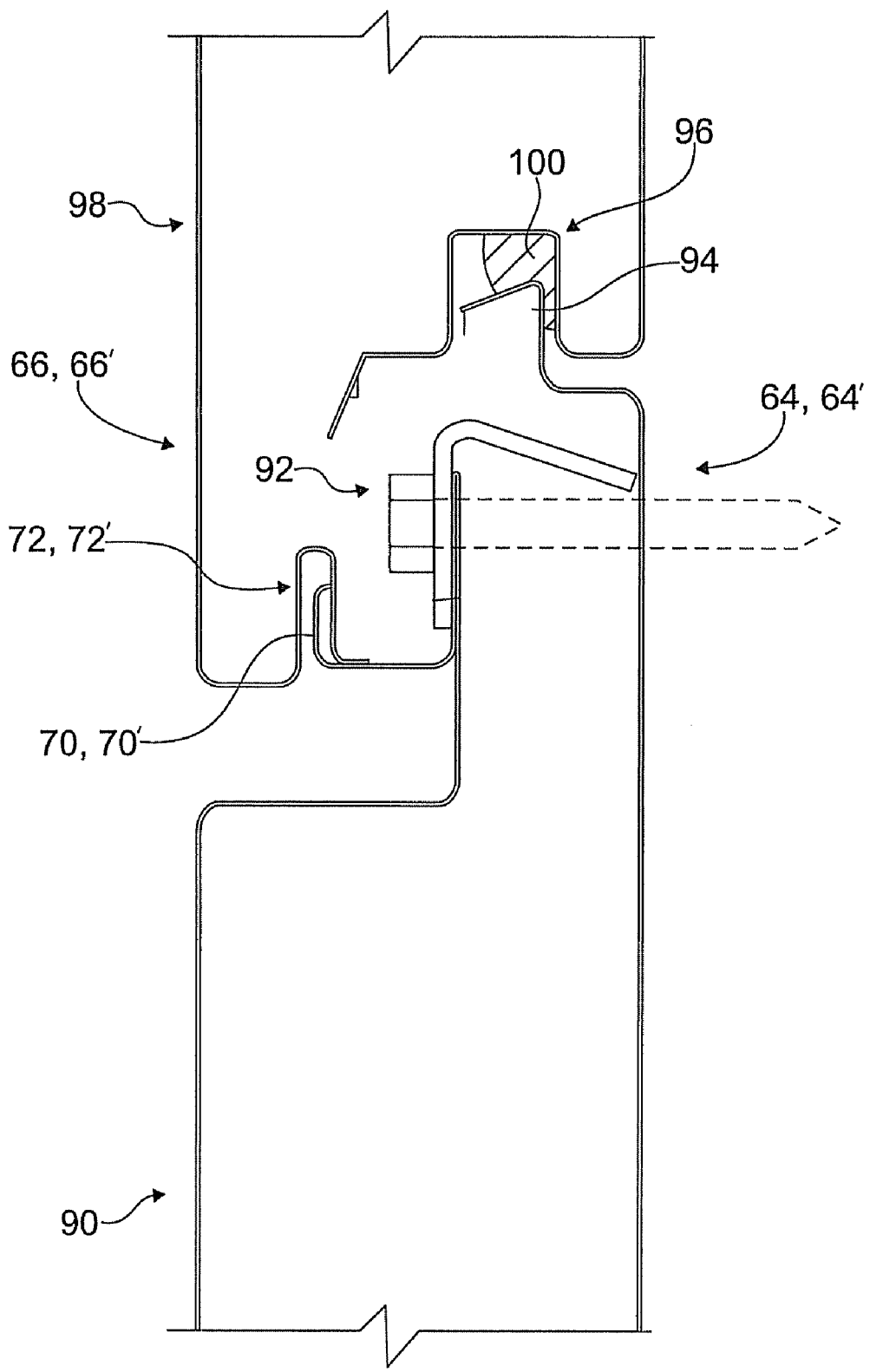
FIG. 11 is a cross-sectional view illustrating attachment of two adjacent building panels.

After the panels have been formed, FIG. 11 illustrates the horizontal joint formed at the connection between adjacent building panels. As shown therein, a bottom panel 90 is connected to a building frame via a connector 92. The edge-hook connector 70, 70' and male connector 94 formed at side joint 64, 64' are received in corresponding female connectors 72 and 96 formed in the side joint 66, 66' of an adjacent building panel 98. A sealant 100 may be applied at the connection between the male 94 and female 96 connectors.

Figure 12:
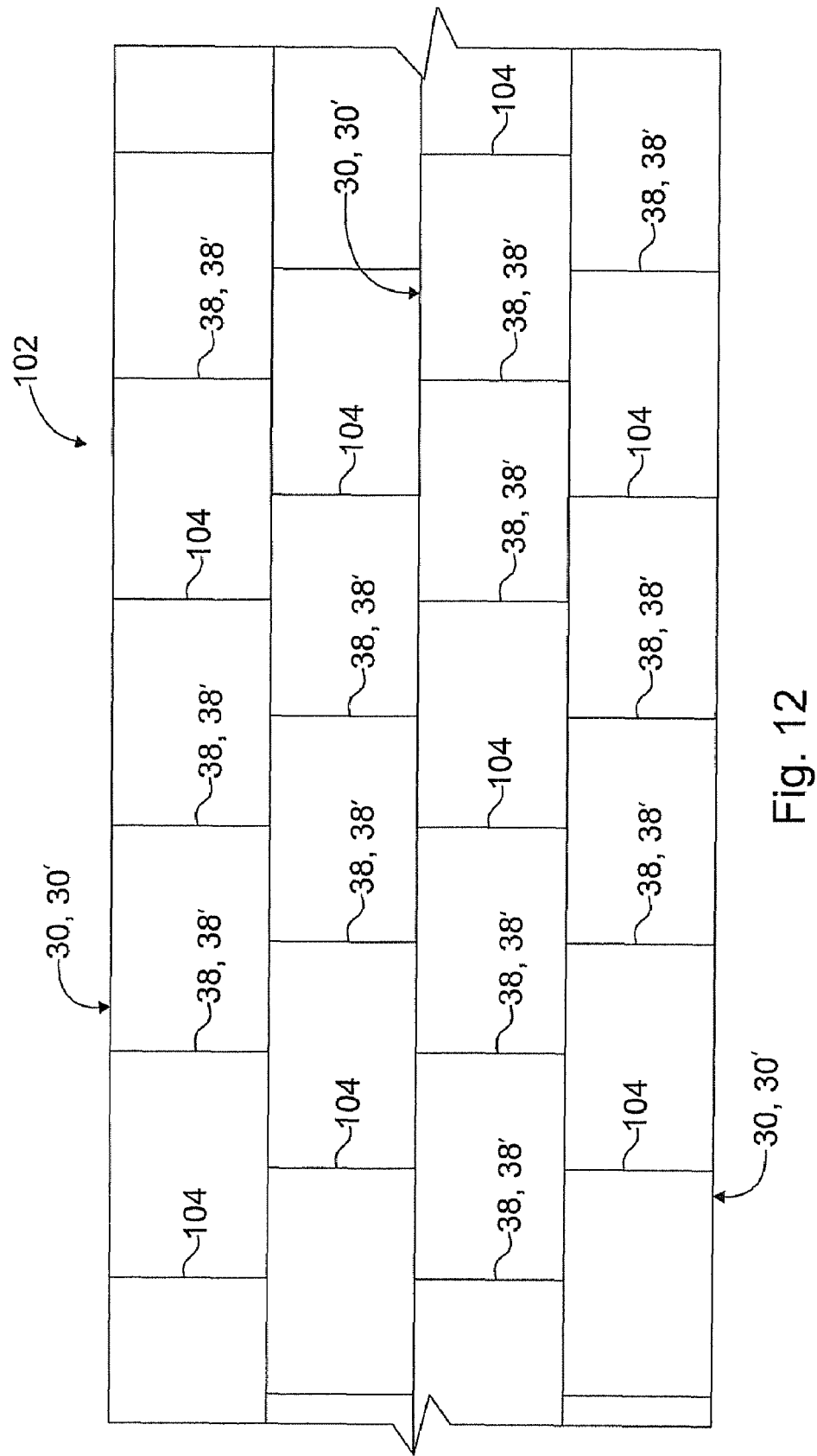
FIG. 12 is a partial view of a wall illustrating the inventive attached to form a masonry brick design.

Various aesthetic designs can be achieved through strategic attachment of the panels to a building frame. One such design that can be achieved is a masonry brick design, as shown in FIG. 12 at 102. The panels 30, 30' are attached such that the false joints 38, 38' and the real joints 104 have a staggered appearance. As shown in FIG. 12, each panel 30, 30' includes two false joints 38, 38', however, each panel may have any number of false joints without departing from the spirit and scope of the present invention. Through use of the inventive panels, installation costs are reduced since smaller individual panels are not needed. The inventive panels having the false joints provide the appearance of smaller panels without an installer having to attach each smaller panel separately. The panels 30, 30' may be flat or have a textured surface, and by embossing or chamfering the flat area of the panel, a stone effect can be achieved. Thus, the inventive panels offer many design variations.

Building panels formed in accordance with the present invention have a facer element that is continuous and easier to handle. As a result, there is continuous metal through the false joints, since they are stamped into the facer element. In addition to the improved manufacturing process, the panels also realize other benefits regarding aesthetics, strength and thermal efficiency.

While the present invention has been described with particular reference to the drawings, it should be understood that various modifications could be made without departing from the spirit and scope of the present invention. For example, the present invention may be used to form panels having virtually any width and length. Also, the various rollers and dies utilized to form the various joinery may be modified to manufacture panels having any size false joint, as will be readily understood by one of ordinary skill in the art.

We claim:

1. A method of forming a building panel including facer and liner sheets surrounding a core material comprising the steps of:
   pre-notching a facer sheet at a false joint;
   roll forming side joints of the facer sheet;
   bending the facer sheet at the pre-notched area to form the false joint, wherein the facer sheet is a continuous sheet across the false joint; and
   bonding the facer sheet having the false joint and the liner sheet to a core material to form the building panel,
   wherein the false joint comprises a depression formed in the facer sheet, the depression comprising a base surface extending into the foam core and opposing side surfaces, and
   wherein the false joint comprises tabs provided one each on the opposing side surfaces at the pre-notched area, wherein the tabs are folded under one of the side joints of the facer sheet in the formation of the false joint.

2. The method of claim 1, further comprising the steps of:
   pre-notching the facer sheet at each real joint; and
   cutting the building panel to length at each real joint.

3. The method of claim 1, further comprising the step of placing a gasket into the false joint.

4. The method of claim 3, wherein the gasket is adhered to the facer sheet at the false joint by an adhesive.

5. The method of claim 1, where the one side joint of the facer sheet include a sloped shelf, and wherein the tabs are folded under the sloped shelf in the formation of the false joints.

6. The method of claim 1, wherein the facer sheet is provided as a coil of sheet material.

7. The method of claim 1, where the facer sheet is made of a metallic material.

8. The method of claim 1, where the false joints are formed via a press operation.

9. The method of claim 1, wherein the core material comprises an insulating foam core material.

10. A method of forming a building panel including facer and liner sheets surrounding a core material comprising the steps of:
    providing a facer sheet in the form of a coil of sheet material, the facer sheet having a length and opposed ends defining a width;
    pre-notching the facer sheet at the opposed ends at each false joint along the length of the facer sheet;
    pre-notching the facer sheet at the opposed ends at each real joint along the length of the facer sheet;
    roll forming the opposed ends of the facer sheet to form side joints;
    bending the facer sheet across the width of the facer sheet at the pre-notched areas to form the false joints, wherein the facer sheet is a continuous sheet across the false joints;
    cutting the facer sheet at each real joint to form a plurality of facer sheets;
    providing a liner sheet in the form of a coil of sheet material;
    bonding the plurality of facer sheets having false joints and the liner sheet to a core material to form building panels; and
    cutting the core material and liner sheet at each real joint of the facer sheets to form separate building panels,
    wherein the false joint comprises a depression formed in the facer sheet, the depression comprising a base surface extending into the foam core and opposing side surfaces, and
    wherein the false joint comprises a tab formed on each of the opposing side surfaces at one of the pre-notched areas at the false joint, wherein the tabs are folded under the side joint of the facer sheet in the formation of the false joints.

11. The method of claim 10, further comprising the step of attaching a gasket into the false joint.

12. The method of claim 10, wherein the side joint of the facer sheet includes a sloped surface, and wherein the tabs are folded under the sloped surface in the formation of the false joints.

13. The method of claim 10, where the facer sheet is made of a metallic material.

14. The method of claim 10, where the false joints are formed via a press operation.

15. The method of claim 10, wherein the core material comprises an insulating foam core material.

* * * * *